(12) United States Patent
Silverstein et al.

(10) Patent No.: US 11,477,042 B2
(45) Date of Patent: Oct. 18, 2022

(54) AI (ARTIFICIAL INTELLIGENCE) AWARE SCRUM TRACKING AND OPTIMIZATION

(71) Applicant: International Business Machines Corporation, Armonk, NY (US)

(72) Inventors: Zachary A. Silverstein, Austin, TX (US); Barton Wayne Emanuel, Manassas, VA (US); Su Liu, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/179,725

(22) Filed: Feb. 19, 2021

(65) Prior Publication Data
US 2022/0271965 A1 Aug. 25, 2022

(51) Int. Cl.
*H04L 12/18* (2006.01)
*H04L 65/1069* (2022.01)
*H04L 65/1083* (2022.01)

(52) U.S. Cl.
CPC ...... *H04L 12/1822* (2013.01); *H04L 12/1818* (2013.01); *H04L 12/1827* (2013.01); *H04L 65/1069* (2013.01); *H04L 65/1086* (2013.01)

(58) Field of Classification Search
CPC ............. H04L 12/1818; H04L 12/1822; H04L 12/1827; H04L 65/1069; H04L 65/1086
See application file for complete search history.

(56) References Cited

U.S. PATENT DOCUMENTS

| 5,440,624 | A | 8/1995 | Schoof, II | |
|---|---|---|---|---|
| 7,974,871 | B2 * | 7/2011 | Oral | G06Q 10/06311 705/7.13 |
| 8,489,615 | B2 * | 7/2013 | Dhara | G06Q 10/1095 707/748 |
| 8,885,806 | B2 * | 11/2014 | Iga | G06Q 10/00 379/202.01 |
| 9,118,734 | B2 * | 8/2015 | Kaminsky | H04L 65/403 |
| 9,143,460 | B2 * | 9/2015 | Dhara | G06Q 10/1095 |
| 9,215,258 | B2 * | 12/2015 | Kaminsky | H04L 65/403 |
| 10,002,345 | B2 * | 6/2018 | Ganani | G06Q 10/10 |
| 10,043,517 | B2 * | 8/2018 | Blandin | G10L 15/26 |
| 10,057,426 | B2 * | 8/2018 | Waugh | H04L 12/1822 |
| 10,382,722 | B1 * | 8/2019 | Peters | G06K 9/00718 |
| 10,459,985 | B2 * | 10/2019 | Shepherd | G06Q 10/101 |
| 10,541,822 | B2 * | 1/2020 | Brunn | G06F 17/18 |
| 10,757,367 | B1 * | 8/2020 | Peters | G06K 9/00718 |
| 10,860,985 | B2 * | 12/2020 | Nelson | G06Q 10/10 |
| 11,057,230 | B2 * | 7/2021 | Brunn | H04L 12/1813 |
| 11,062,271 | B2 * | 7/2021 | Nelson | G06N 20/00 |

(Continued)

OTHER PUBLICATIONS

Disclosed Anonymously, Intelligent Time Management for Smarter Meetings, IPCOM000220154D, ip.com, Jul. 24, 2012, 10 pages.

(Continued)

*Primary Examiner* — George C Neurauter, Jr.
(74) *Attorney, Agent, or Firm* — Alexander Jochym; Otterstedt & Kammer PLLC

(57) ABSTRACT

A management layer for electronic or virtual meeting tools is configured to automatically manage a virtual meeting environment established between computing devices using time based controls, data collection, and feedback mechanisms.

17 Claims, 7 Drawing Sheets

(56) References Cited

U.S. PATENT DOCUMENTS

Figure 1:
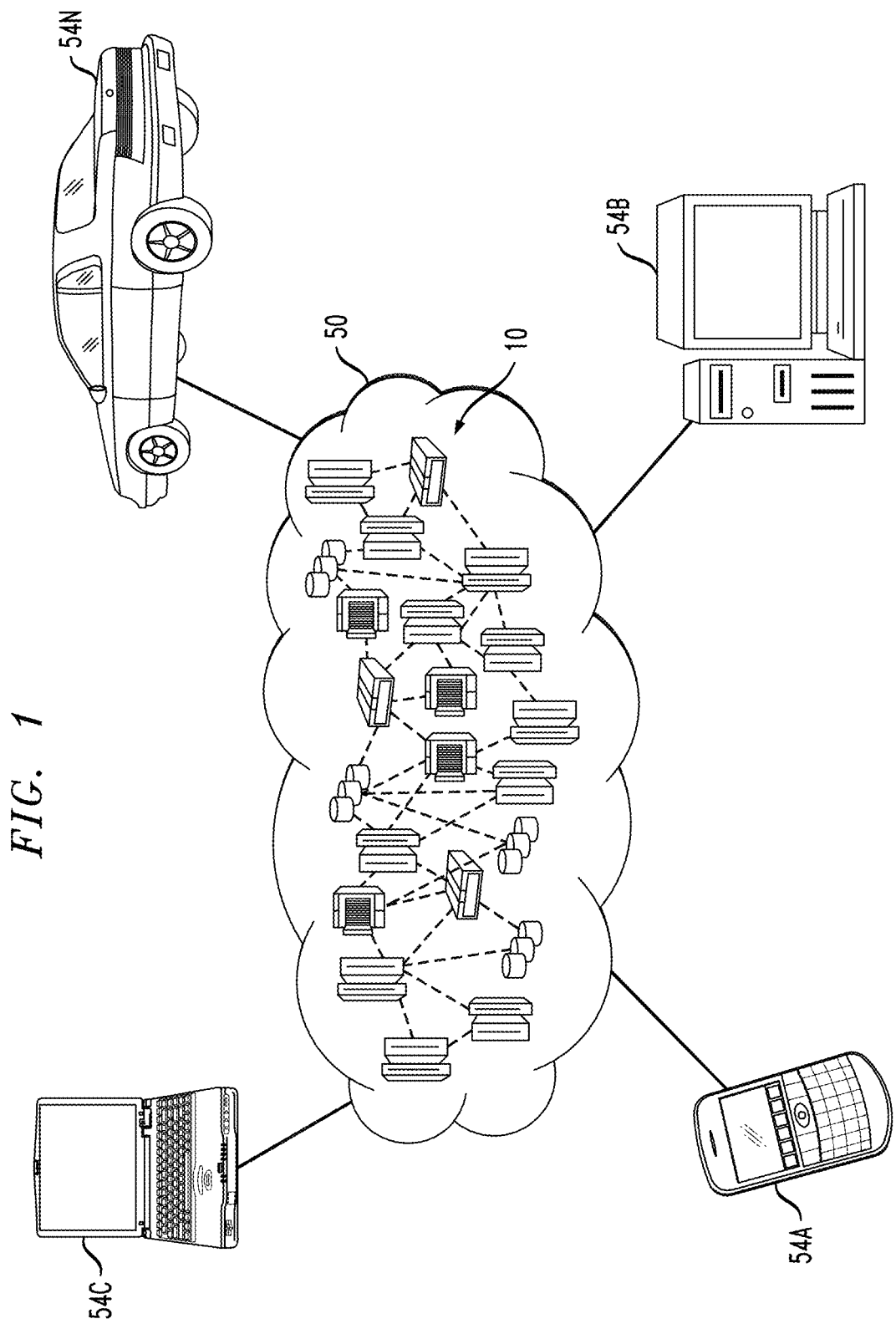

| | | | |
|---|---|---|---|
| 11,120,342 B2* | 9/2021 | Kitada | G06F 16/9535 |
| 2005/0050061 A1* | 3/2005 | Karstens | G06Q 10/109 |
| 2006/0224430 A1* | 10/2006 | Butt | G06Q 10/063116 |
| | | | 705/7.16 |
| 2008/0022209 A1* | 1/2008 | Lyle | G06Q 10/107 |
| | | | 715/730 |
| 2010/0318399 A1* | 12/2010 | Li | G06Q 10/1093 |
| | | | 705/7.18 |
| 2011/0295392 A1* | 12/2011 | Cunnington | H04N 7/15 |
| | | | 700/90 |
| 2013/0178959 A1* | 7/2013 | Hirsch | G16Z 99/00 |
| | | | 700/91 |
| 2016/0117624 A1* | 4/2016 | Flores | H04L 67/306 |
| | | | 705/7.39 |
| 2016/0127474 A1* | 5/2016 | Sharma | H04L 65/4061 |
| | | | 709/228 |
| 2016/0247520 A1* | 8/2016 | Kikugawa | G10L 15/26 |
| 2016/0285929 A1* | 9/2016 | Oganezov | H04L 65/1093 |
| 2018/0039951 A1* | 2/2018 | Wynn | H04N 7/15 |
| 2018/0046957 A1* | 2/2018 | Yaari | G06Q 10/1095 |
| 2018/0232705 A1 | 8/2018 | Baker et al. | |
| 2019/0394057 A1 | 12/2019 | Bujnowski et al. | |
| 2021/0014676 A1 | 1/2021 | Silverstein et al. | |
| 2021/0076002 A1* | 3/2021 | Peters | G06K 9/00718 |
| 2021/0117929 A1* | 4/2021 | Lewbel | H04L 12/1822 |
| 2021/0224753 A1* | 7/2021 | Nasir | G06Q 10/1095 |

OTHER PUBLICATIONS

Lascu et al., Server Time Protocol Planning Guide, ibm.com/redbooks, Jun. 2013, pp. 1-230.

* cited by examiner

AI (ARTIFICIAL INTELLIGENCE) AWARE SCRUM TRACKING AND OPTIMIZATION

BACKGROUND

The present disclosure relates generally to a computer processes, and more particularly to methods for automatically managing a scrum based application.

Virtual meetings, including scrums, are typically hosted by a server or a meeting host's computing device, and operate to exchange data between meeting participants across a network.

SUMMARY

According to some embodiments of the present invention, a method of managing a virtual meeting environment established between a plurality of computing devices includes initializing the virtual meeting environment, receiving an opt in from each of a plurality of member devices corresponding to respective members, receiving expected timing data for the virtual meeting environment and the members, monitoring a time of speech for each of the members within the virtual meeting environment and a total time of the speech of the members within the virtual meeting environment overall, determining a deviation from the expected timing data, communicating a control signal to one or more of the member devices, the control signal causing the one or more of the member devices to notify the corresponding members of the deviation, and processing the expected timing data to determine refactored timing data modifying the timing for one or more the members for a remainder of the virtual meeting environment overall.

According to some embodiments, a computer implemented system includes a learning module accessing data collected in a first instance of a meeting and determining expected timing data for a plurality of members, a refinement module accessing the expected time data, and a monitoring and reaction module tracking speech uttered by members during a second instance of the meeting, wherein the members are associated with a plurality of computing devices connected by a network and establishing a virtual meeting environment, wherein the monitoring and reaction module is embodied by a server-side computing device of the computing devices, the monitoring and reaction module configured to determine a deviation from the expected timing data, communicate a first control signal to one or more of the computing devices configured to cause the one or more of the member devices to notify the corresponding members of the deviation, and process the expected timing data to determine refactored timing data modifying the timing for one or more the members for a remainder of the virtual meeting environment overall.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings:

FIG. 1 depicts a cloud computing environment according to an embodiment of the present invention;

FIG. 2 depicts abstraction model layers according to an embodiment of the present invention;

FIG. 3 is diagram of a system configured for intelligent management of a virtual meeting environment according to some embodiments of the present invention;

FIG. 4 is flow diagram showing a method for intelligent management of a virtual meeting environment according to some embodiments of the present invention;

FIG. 5 is diagram of a network of devices configured for supporting a virtual meeting environment according to some embodiments of the present invention;

FIG. 6 is a diagram of a user interface configured for intelligent management of a virtual meeting environment according to some embodiments of the present invention; and FIG. 7 depicts a computer system that may be useful in implementing one or more aspects and/or elements of the invention.

DETAILED DESCRIPTION

Embodiments of the present invention address the lack of management tools in conventional electronic or virtual meeting tools by introducing a non-conventional management layer configured to automatically manage a virtual meeting application. Some embodiments introduce managed context and time based controls on the scrum based application. Some embodiments include improved data collection, including a stand-up status, status delivery, and feedback mechanisms.

As used herein, a virtual meeting (or conference) comprises exchanging audio data and/or video data (including augmented video) amongst a plurality of devices corresponding to a plurality of meeting members (users). According to some embodiments, the virtual meeting is hosted by a server or a meeting host's computing device, and the exchange of data is across a network, such as the Internet, an organization's private network, etc.

Virtual meetings are typically unmanaged, with participants being responsible for timing. Frequently these meetings last longer than an initial scheduled time. These delays hold up computer resources devoted to the meeting.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

automated refactored timing data determined for a virtual meeting environment established by a number of computing devices;

control signals communicated among computing devices of a virtual meeting environment for real-time dissemination of refactored timing data;

control signals communicated among computing devices of a virtual meeting environment for real-time alerts of deviations of expected timing data.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
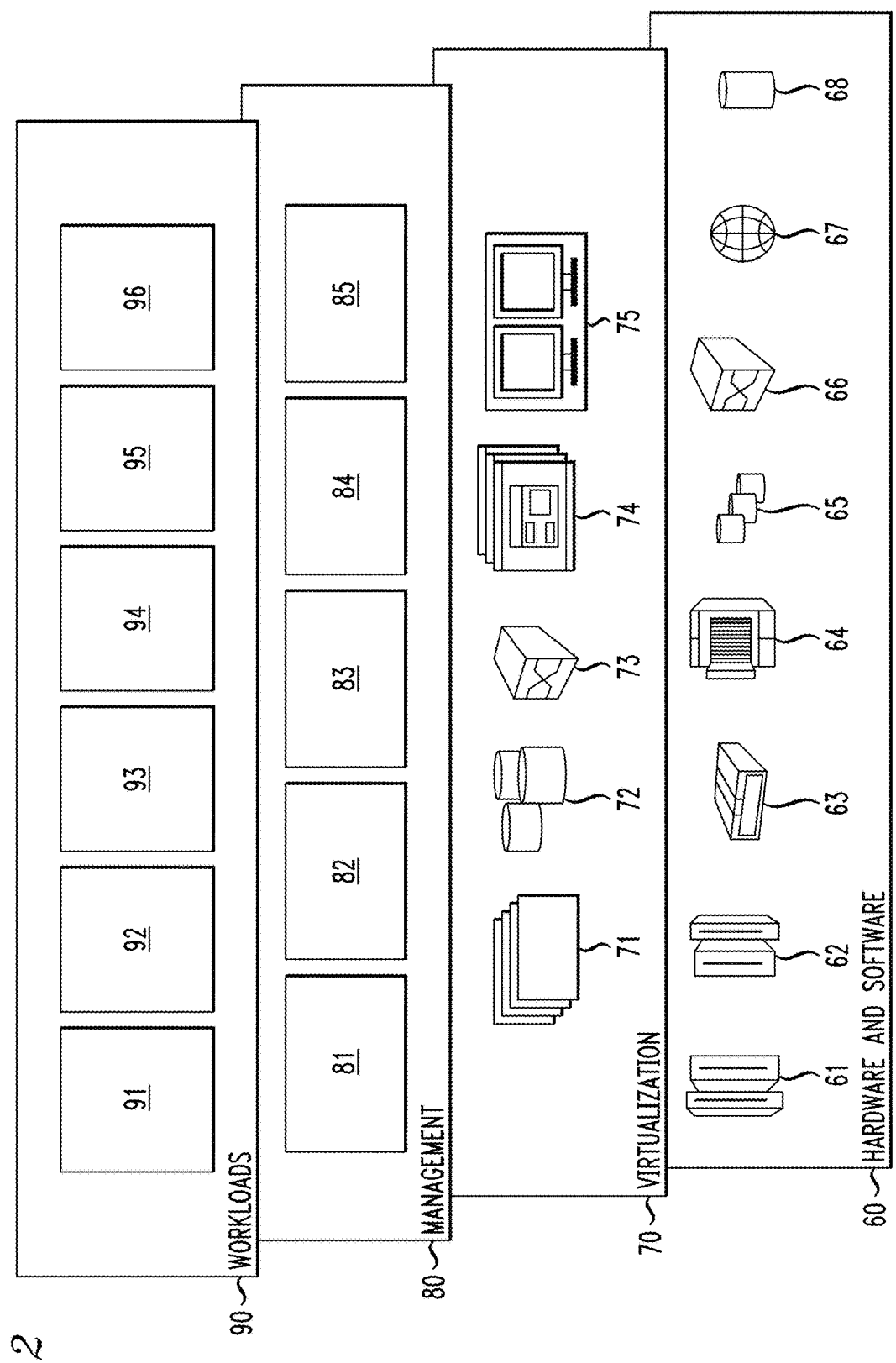

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent management of a virtual meeting environment 96.

Figure 3:
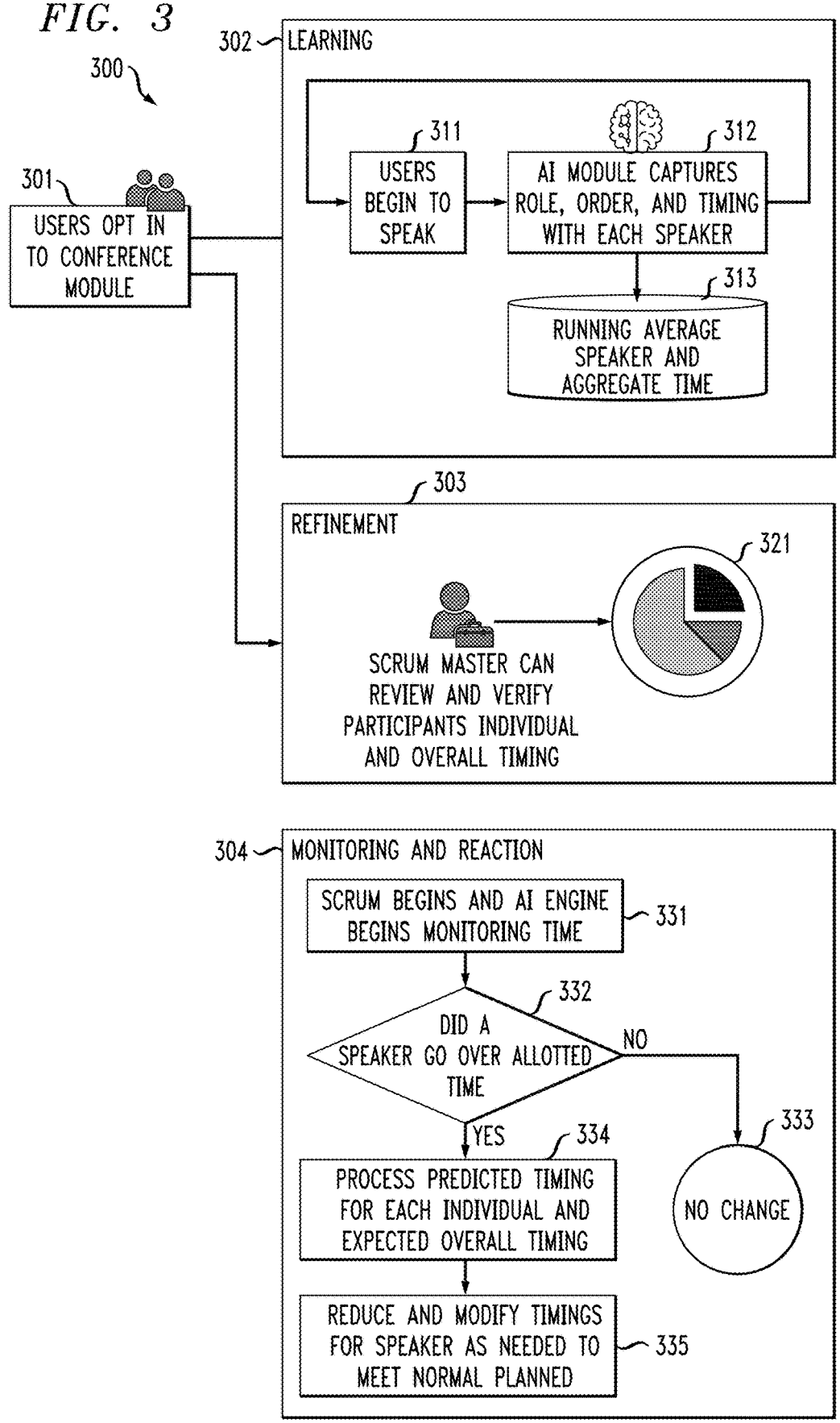

According to some embodiments and referring to FIG. 3, meeting members electronically connect to a virtual meeting 301, enabling tracking and tooling recommendations. Members opt-in to the system 300 by connecting to the virtual meeting. According to at least one embodiment, the members grant control to a project management or scrum conferencing tool executing on a server supporting the meeting.

The meeting environment includes a learning module 302, a refinement module 303, and a monitoring and reaction module 304. The modules are software modules embodied on a computer readable storage medium.

Some embodiments of the present invention are implemented as a method that is loaded in connection with conventional meeting technologies such as WEBEX® or Zoom, where additional features are added, improving the underlying applications.

According to some embodiments, the learning module 302 is configured to collect data about participants and determine participant roles within the context of the meeting. For example, as each member speaks 311, the learning module 302 determines the current member's role, an order in which the current member is speaking in relation to the other members, and a total time that each member has spoken (e.g., as a percentage of the meeting's elapsed time, as an absolute time that is ranked among the members, etc.) 312. The learning module 302 stores data for each member including, for example, a running average time of each utterance, and an aggregate time of all utterances in a memory or database 313.

According to some embodiments, the learning module 302 implements voice recognition code to identify new members, distinguish between members, etc. The learning module 302 associates portions of speech (captured during a meeting) with different members, and determines a length of time that each member speaks. The learning module 302 records an order in which each member speaks (e.g., member A speaks $1^{st}$, $3^{rd}$, and last, member B speaks $2^{nd}$, $7^{th}$, etc.). The learning module 302 learns a role of each member. According to at least one embodiment, roles (e.g., host, participant, client, etc.) are registered in the system 300, and names of members are assigned via Natural Language Understanding (NLU) of the speech.

According to at least one embodiment, the members can be identified by their devices, such as a smartwatch, Radio Frequency Identification (RFID) tag embedded in a security badge, or some other device that serves as a unique Internet of Things (IoT) based identifier.

According to some embodiments, the database 313, which is populated with information about each member on the scrum call as the information is captured. According to at least one embodiment, the information is updated each time the current speaker changes (e.g., member C beings to speak) and tracked within the database 313.

According to some embodiments, the database 313 is deployed in a cloud environment. According to at least one embodiment, certain meetings are recurring (e.g., a monthly sales meeting, or a scrum sprint meeting), and information collected during different instances of the same meeting are linked in the database 313, for example, to reveal information or trends over all instances of the same meeting.

According to some embodiments, the learning module 302 divides meeting time among all the members. For example, an Artificial Intelligent (AI) module processes the amount of time the scrum is scheduled for, and each member's average portion of speaking time is tracked. According to one or more embodiments, the methods calculates an average time occupied by a given member/speaker each day, and identifies recurring orders (e.g., member B speaks after member A in 55% of the scrums, member D speaks $4^{th}$ in 30% of the scrums, etc.). According to some embodiments, the learning module 302 determines a guest based time inclusion. The guest based time inclusion provides additional weighting for guest(s) that attending the scrum to make an announcement or guest comments, for example, in a case where a first line manager joins the scrum to provide the other members insight on a certain topic.

According to some embodiments, system's refinement module 303 enables the management of time inclusion based on historical context. For example, before the beginning of a next instance of a recurring meeting, the refinement module 303 outputs data, e.g., a chart, of average speaker and timing chart (e.g., a pie chart 321), to a leading member's device.

According to one or more embodiments, the average speaker timing is used to set pacing for dynamic meetings. For example, speaker Z typically speaks for 4 minutes, and the (recurring) meeting typically finishes on time (i.e., not extending over a scheduled time). The system uses this information to track a current meeting and, in a case, where Z is speaking for 6 minutes (i.e., Z has gone over the expected time by 2 minutes), identifies a deviation from an expected timing. According to some embodiments, the system issues an alert, e.g., through the graphical representation, based on the timing to the speaker and meeting host.

According to some embodiments, the refinement module 303 presents the meeting's leading member with tools (e.g., a user interface controlling a schedule, expected speaking times, etc.) to adjust the meeting. For example, the leading member can set a designated target speaking time.

Upon a meeting beginning, an AI meeting engine of the monitoring and reaction module 304 monitors one or more timing parameters 331. According to one or more embodiments, the monitoring and reaction module 304 tracks and outputs, from a meeting starting at time 00:00, each member's elapsed speaking time. At block 332 the monitoring and reaction module 304 determines whether a current member is speaking more than an expected time. In a case where a single member is over an expected time, or the members are over an expected time for the meeting, the monitoring and reaction module 304 processes the expected timing for each member and the overall time of the meeting 334, reducing and modifying the expected timing for each member to meet a planned time of the meeting 335. According to one or more embodiments, the monitoring and reaction module 304 performs a readjustment of expected speaking times for each member based on a remaining time for the meeting 335. For example, if a given speaker talks over their allotted time 332, the AI engine readjusts other participant times to ensure on-time completion of the scrum, while still allowing all members the opportunity for speaking within a fair and organized approach.

According to some embodiments, the AI engine dynamically modifies each user's speaking time. For example, in the case where Z has gone over the expected time by 2 minutes, and there were 4 other speakers, each speaker's expected time is reduced by 30 seconds. According to some embodiments, the system maintains a plurality of clocks, including an overall meeting clock, and a separate clock from each respective speaker.

According to one or more embodiments, the monitoring and reaction module 304 outputs a count down from the starting time at 10:00, 15:00, 20:00, etc. The countdown is output to individual members to their own expected speaking time and at the group level for the entire meeting.

According to one or more embodiments, the monitoring and reaction module 304 includes a dynamic visual counter.

According to some embodiments, the leading member and other members are presented (e.g., in a UI of their respective devices or a shared device) with a visual counter for how much time each member has been allotted (e.g., presented as a visual count down that resets for each member—the reset can be to a value determined for individual members and may not be the same for all members). According to some embodiments, a UI timer is presented in a Web conference interface, and can be displayed as a countdown or a timer. For example, the monitoring and reaction module 304 can display a timer, and/or issue an audible signal when an expected speaking time is reached by a given member.

According to some embodiments, the monitoring and reaction module 304 enables meeting changes, including changes to an alarm, within the UI to notate a changed interaction pattern, such as modified timing information. According to at least one embodiment, the members of the meeting are shown the new timing information. According to some embodiments, the new timing information is sent back as a learning feedback loop into the system for average processing.

According to some embodiments, historical machine learning and optimization are employed, where, based on a daily usage observation, the system 300 makes a recommendation for the re-organization pertaining to the order in which members speak. For example, if a given member is known to speak longer than an expected/allocated time at the beginning of meetings, the system 300 reorganizes a speaking priority of the members, and places the member at the end of the meeting to help ensure their stand-up/update are limited, as the meeting must end on time.

Figure 4:
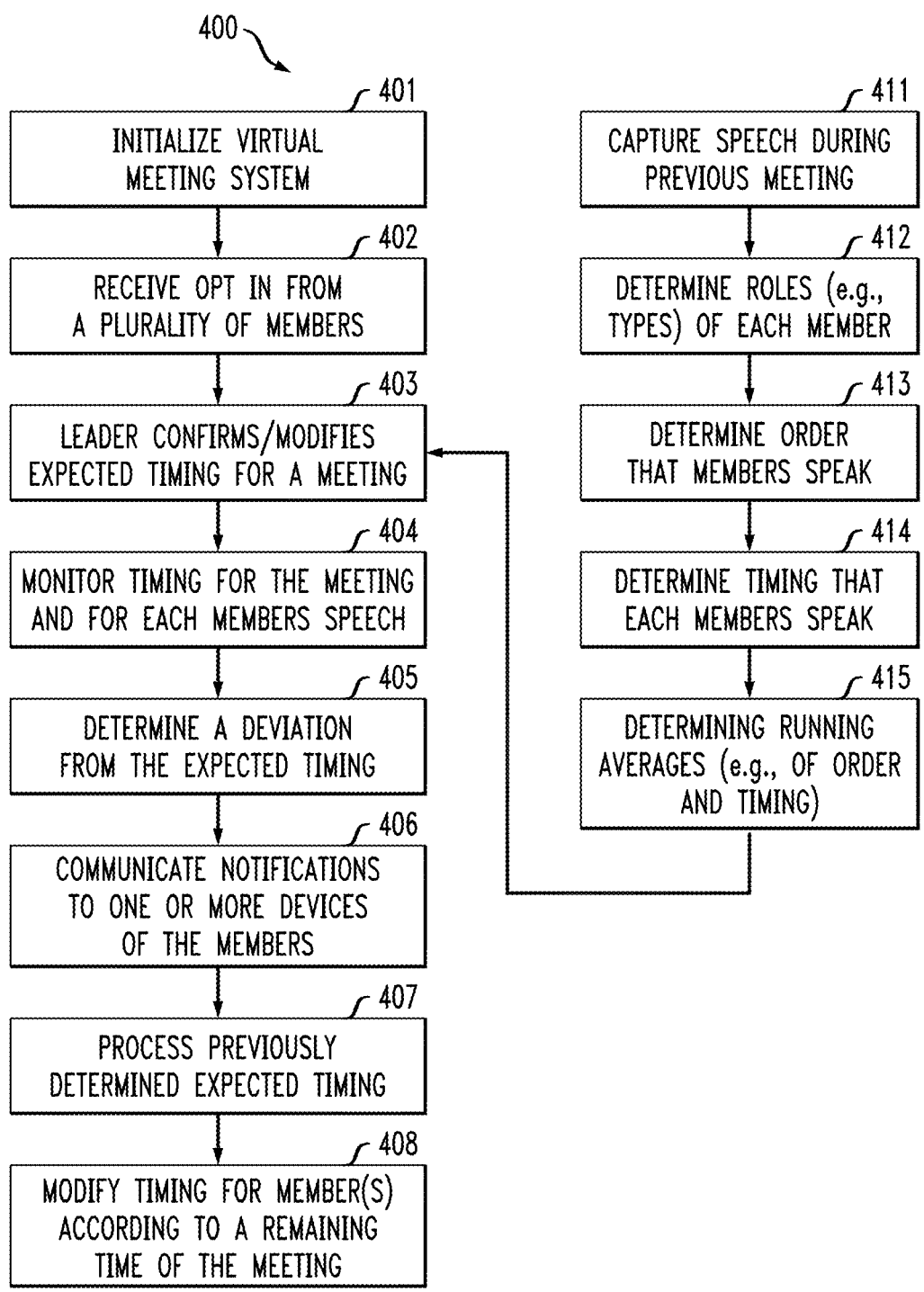

According to one or more embodiments and referring to FIG. 4, a method 400 of intelligently managing a virtual meeting environment includes initializing the virtual meeting environment 401 and receiving opt in from a plurality of members 402. At block 403, the method uses previous information (see blocks 411-415) gleamed from prior instances of the virtual meeting to set expected order and timing data from the meeting and the members. Further, according to at least one embodiment, a meeting host can confirm or modify the previous information 403.

According to some embodiments, the previous information is based on speech captured during one or more previous instances of the meeting 411. According to at least one embodiment, a role of each member is determined (or provided by a system user) 412. For example, the roles can be dynamically extracted through profile processing of a user database using a Lightweight Directory Access Protocol (LDAP) at 412. These roles can be determined based on natural language processing. According to some embodiments, a role includes a type of member that can be assigned to one or more members. The method includes determining an order that the members speak 413 and a timing of the speech of each member 414. The method determines a running average for the collected data, including for example, the order and timing of speech for each member 415. According to at least one embodiment, the average is determined for a type of member and applied (e.g., as expected values) to those members in a subsequent meeting.

At block 404 the method monitors timing for the current meeting and speech of each member. According to some embodiments, voice recognition or active speaker detection can be used at block 404. Active speaker detection detects whether audio is received from a particular source or microphone, and whether the audio is significant (e.g., the audio is a primary noise, a voice is recognized, etc.).

The method monitors the meeting 405 and determines a deviation from the expected timing 406. According to some embodiments, the method communicates a control signal to one or more of the members, causing a connected (to the virtual meeting environment) device to notify the members of the deviation 406. At 406 the notification can be a push notification to the one or more members' devices or a popup on the conferencing or e-meeting application(s), such as a timer appearing in a display screen or an audio tone. The method processing the previously determined expected timing 407 and modifies the timing for one or more members (e.g., for individual members, types of members, members for certain roles, etc.) for the remainder of the planned meeting time 408.

Figure 5:
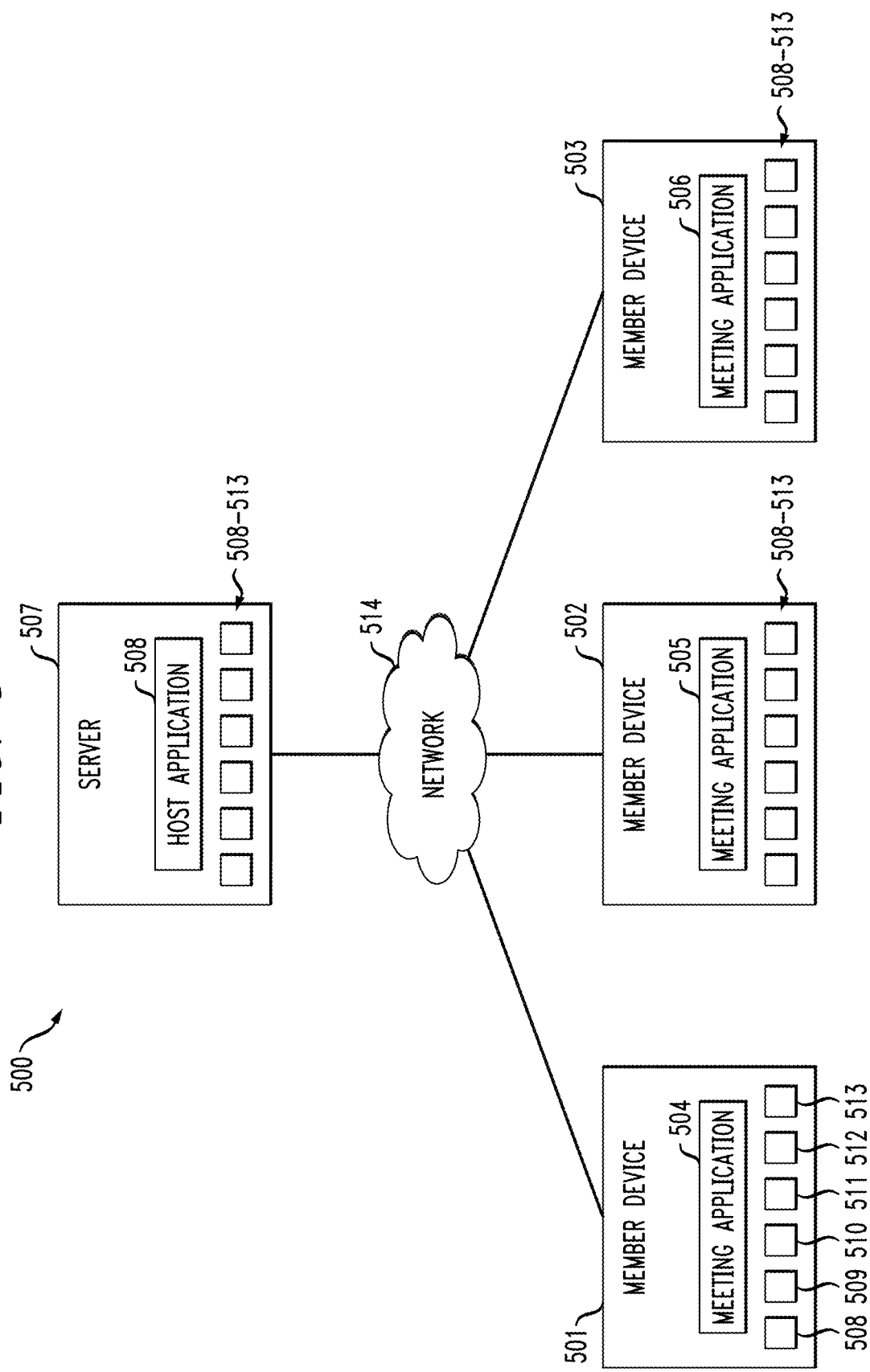

FIG. 5 is diagram of a network of devices 500 configured for supporting a virtual meeting environment according to some embodiments of the present invention. According to some embodiments of the invention, each of the member devices 501-503 comprises a computing device configured to perform conferencing functions for its respective user. According to at least one embodiment, each of the member devices 501-503 comprises a computing device such as a laptop computer, tablet computer, smartphone, etc., and may include one or more elements of computer system 12 of FIG. 7. In embodiments, each of the member devices 501-503 comprises a meeting application 504-506 that is a client program configured to connect the receptive device to a virtual meeting hosted by the meeting server 507. The meeting server 507 can be a computing device of the meeting host or an independent server hosting the meeting, for example, via a host application 508. Each of the member devices 501-503 and the meeting server 507 can also comprise components including, but not limited to, a microphone 508 for capturing audio (e.g., speech) emitted by a user; an audio speaker 509 for emitting audio to the user; a camera 510 for capturing video images of the user; a display screen 511 for displaying video output to a user; an input system 512 including one or more of a touchscreen (e.g., incorporated in the display screen), a mouse device, a trackpad, a keyboard, and a keypad; and a headphone port 513 for connecting headphones.

According to some embodiments, the virtual meeting is hosted by the meeting server 507, and the exchange of data is across a network 514, such as the Internet, an organization's private network, etc.

According to some embodiments, the meeting server 507 is a computing device configured to provide meeting/conference services to the member devices 501-503, e.g., in a client-server arrangement. For example, the meeting server 507 can be configured to receive audio and/or video signals from the member devices 501-503, and to generate and transmit respective audio and/or video signals to each of the member devices 501-503 during a meeting. In accordance with at least one embodiment of the invention, the meeting server 507 is configured to intelligently manage a virtual meeting environment in the manner described herein. In implementations, the meeting server 507 is a computing device that comprises one or more elements of computer system 12 of FIG. 7, which stores and runs one or more program modules that perform functions described herein. In embodiments, the meeting server 507 comprises a host application 508, which comprises one or more program modules such as program module 42 as described with respect to FIG. 7.

Figure 6:
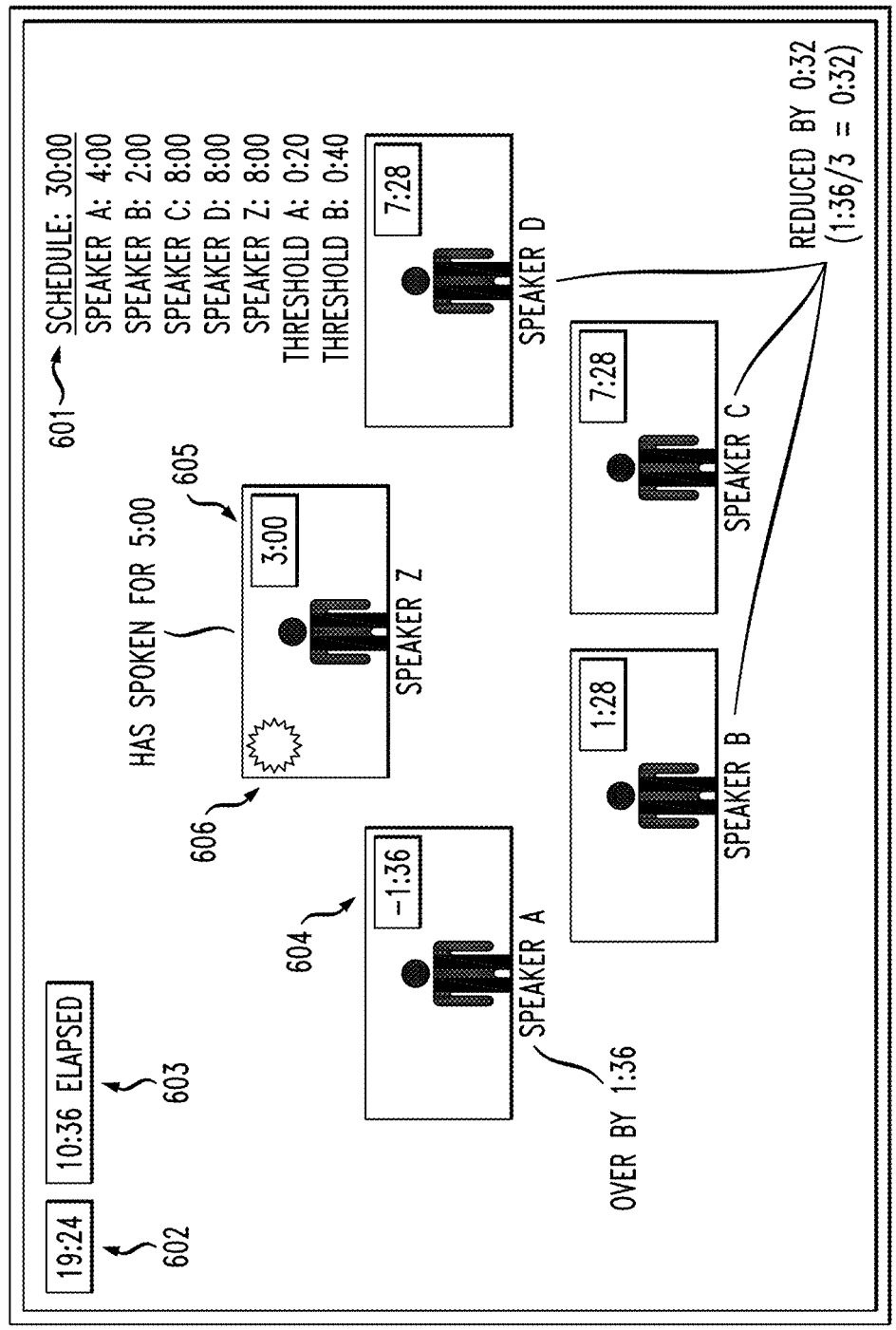

FIG. 6 is a diagram of a user interface (UI) 600 configured for intelligent management of a virtual meeting environment according to some embodiments of the present invention. The UI includes an indication of the initial schedule 601, including a scheduled time for meeting and the expected speaking time of each member. The UI can include indications of a remaining time 602 and an elapsed time 603. In the example shown in FIG. 6, the meeting is scheduled for 30 minutes, the host member, Speaker Z, has spoken for 5 minutes of the 8 minutes scheduled, thus the host's timer 605 indicates that there are 3 minutes remaining for Speaker Z. Further, the UI shows that Speaker A has spoked for 5 minutes and 36 seconds (1 minute and 36 seconds over the expected time of 4 minutes). Furthermore, it should be observed that the system has automatically reduced the expected speaking time of Speakers B, C, and D by 32 seconds (as is displayed in the respective timers). According to some embodiments, members' roles can be indicated by tokens, for example, in FIG. 6, the hose is indicated by a visual token 606.

According to some embodiments, the system is configured with different tiers of members, such that the expected speaking time of a higher tier member is not reduced by a lower tier member running over their expected speaking time. According to at least one embodiment, the tiers are disposed in a hierarchy in a timing network maintained by the server. For example, in FIG. 6, Speaker Z's expected speaking time is not reduced by Speaker A running over A's own expected speaking time.

According to at least one embodiment, the system maintains timekeeping information for each member. According to some embodiments, the system maintains timekeeping information for groups of members, for example, Speakers C and D may belong to a group (e.g., a business unit) allotted a total time of 16 minutes, and in a case where Speaker C runs over, only Speaker D's time is reduced by the system. That is, according to some embodiments, the system manages timekeeping information for individual members, tiers of members, groups of members, etc.

According to some embodiments, the server or another device maintains the timekeeping information for the network of devices (see FIG. 5). For example, the server 507 maintains a database in real-time for timekeeping information based on detected/recorded speech during the meeting. The server 507 populates the database with the timekeeping information, in which the expected speaking time of each member is managed based on real-time speech. The server causes one or more displays of the network 500 to display the timekeeping information, synchronized to the real-time speech of the members, tiers, and groups participating in the meeting. The synchronization can be referred to as time refactoring.

According to some embodiments, the system employs a Server Time Protocol (STP), which is a message-based protocol in which timekeeping information is passed over data links between devices of the meeting. The STP synchronizes the clocks (e.g., 602-604) corresponding to various members. The STP executing on the server 507 enables different timing modes (e.g., time remaining or elapsed time), timing states (e.g., an indication that a given speaker is active, where that speaker's timer will be actively displaying a time remaining, any notifications, a time over the expected time, etc.), external interrupts, such as in a case where the meeting is paused, etc.

According to some embodiments, a Simple Network Time Protocol (SNTP) application is used as a time-maintenance application to synchronize devices in the network. The devices of the network can be time synchronized to a Coordinated Server Time (CST) on the server 507 or another device. The CST represents the time for the entire network of devices.

Referring to FIG. 5 and FIG. 6, and according to one or more embodiments of the present invention, each member is associated with a visual timer, e.g., 604, which is displayed on one or more client devices. For example, speaker A is associated with a visual timer 604. Each visual timer is configured to display a time based on communication among the devices of the system 500. The visual timers can be embodied in a variety of hardware and/or software. For example, the visual timers can be a module, widget, etc., loaded into a video conference application, which enables communication between the visual timers. Each visual timer displays a corresponding time. The time (e.g., the time associated with speaker A) can be tracked on the client-side device, e.g., 501 (for example, on the device of speaker A) and/or on a server-side at the server 507.

According to some embodiments, for either client-side tracking or server-side tracking, the relevant times are monitored (e.g., by a software module embodying the visual timer) for each speaker based on the speaker's activity parameters during a meeting. According to at least one embodiment, these activity parameters can be detected as continuous sustained output of a statistically significant magnitude (e.g., speaking activity greater than a threshold for a mere utterance). According to one or more embodiments, factors used to derive that a member is speaking (i.e., that there is speaker activity) can include a reduction or lack of audio from other members (as people tend to not talk over each other).

According to some embodiments, a server-side module installed at server 507 monitors data streams received from each member devices (e.g., client-side visual timers) and decrements each member's allotted (expected) talk time according to monitored speaking time. The server 507 can send control signals to the member devices to directly control the displayed time (e.g., in a case where a UI at the member devices displays data generated by the server) or provide data to the visual timers installed at each member device, enabling individual applications installed at each time to calculate a time to be displayed. It should be understood that the timers are coordinated according to the dynamic speaking time of each member. According to some embodiments, when a given member's talk time becomes negative, or past their expected talk time, a respective module will query the parameters (e.g., the initial schedule 601) set for the meeting. These parameters facilitate how time refactoring is performed for the AI meeting engine (e.g., time refactoring rules defining actions based on monitored talking time of each member—including the host—and any groups, tiers, hosts, etc.).

An example of a time refactoring rule applied by the AI meeting engine (e.g., deployed server-side) decrements each member's time equally in a case where a leading member reduces a total expected time of a meeting. In another example, the AI meeting engine decrements each member's time proportionally to their own initial individual allotment. In both examples, a server running an AI meeting engine application can push a control signal to one or more devices of the meeting (e.g., a pop-up warning that a member is about to go over an expected time, a modification of the members' timers, etc.). According to some embodiments, one or more timers are displayed on a screen of each member's device.

According to some embodiments, each member's device runs a client-side application utilizing webhooks to communicate to the server-side application, where the server provides iterative updates on the various timers (e.g., remaining expected speaking time) as monitored by a server-side monitoring and reaction module 304. The monitoring and reaction module 304 maintains a table of all members, their expected speaking time, their actual speaking time, and an instantaneous value of their speaking time remaining. The speaking time remaining can be pushed to the client-side via webhooks, and the client-side devices, running the client-side conference application, presents the relevant timing. According to one or more embodiments, the server-side application performs the time refactoring. For example, the time refactoring can be continually calculated at the server-side and communicated to the client-side, e.g., indicating changing (e.g., remaining) speaking times of the members.

According to some embodiments, members' devices display refactored (e.g., decreased) time during the meeting, for example, decreasing in case where a given speaker goes over an expected time. The various client-side timers (see FIG. 6) are hidden from one or more members, made available to certain members (e.g., managers or hosts), etc. The timers can be displayed as, for example, a stopwatch, a digital timer/countdown, or an abstracted push notification propagated to the member devices. In the example case of the push notification, such a notification can be propagated to any member device associated with a member who is within some time (e.g., 1 minute) of the expected speaking time as an alert. In another example, the push notification is broadcast to all other members, notifying them of a timing refactoring. In some embodiments the members' timers react to the significance of a timing disparity, for example, a timer of a speaker who is over the expected time by a first threshold (e.g., "Threshold A" in FIG. 6 setting 20 seconds over the expected time) can turn red and blink after a second threshold (e.g., "Threshold B" setting 40 seconds over the expected time). These thresholds can be set manually by individual members, set by the meeting host as part of the initial parameters 601 (e.g., when the initial schedule is determined), etc.

According to one or more embodiments, the AI engine captures a topic discussed. The AI engine captures conversations between members in the meeting and uses a ruleset to decrement specific timers for members, topics, etc. According to some embodiments, the AI engine of the monitoring and reaction module 304 can be changed, for example, by the meeting host, from member focused timing to topic focused timing.

According to some embodiments, upon reaching an expected timing for a member, the monitoring and reaction module 304 communicates a control signal a mobile device, causing the mobile device to output a notification such as a vibration, a sound, a flash, etc. The notification can be simultaneously repeated on the device of the meeting host; the control signal is simultaneously output to the device of the meeting host.

According to some embodiments, the system sanitizes data of particular members by calculating average time(s) for types of members and updates the recommendation(s) for elapsed time and warnings to members based on the average being exceeded for a member's type of role within the meeting.

According to some embodiments, IoT devices further aid the system to identify members of the meeting, even when the members are not associated with a personal device. For example, an IoT type identifier communicating with the system captures identifying information of the member. This identifying information can supplement other identification information, providing a second (or additional) form of identification. This information can be based on voice or visual recognition.

Recapitulation:

According to some embodiments of the present invention, a method of managing a virtual meeting environment established between a plurality of computing devices, the method comprises initializing the virtual meeting environment 401, receiving an opt in from each of a plurality of member devices corresponding to respective members 402, receiving expected timing data for the virtual meeting environment and the members 403, monitoring a time of speech for each of the members within the virtual meeting environment and a total time of the speech of the members within the virtual meeting environment overall 404, determining a deviation from the expected timing data 405, communicating a control signal to one or more of the member devices, the control signal causing the one or more of the member devices to notify the corresponding members of the deviation 406, and processing the expected timing data to determine refactored timing data modifying the timing for one or more the members for a remainder of the virtual meeting environment overall 407-408.

According to some embodiments, a computer implemented system includes a learning module 302 accessing data collected in a first instance of a meeting and determining expected timing data for a plurality of members, a refinement module 303 accessing the expected time data, and a monitoring and reaction module 304 tracking speech uttered by members during a second instance of the meeting, wherein the members are associated with a plurality of computing devices connected by a network and establishing a virtual meeting environment, wherein the monitoring and reaction module is embodied by a server-side computing device of the computing devices, the monitoring and reaction module configured to determine a deviation from the expected timing data, communicate a first control signal to one or more of the computing devices configured to cause the one or more of the member devices to notify the corresponding members of the deviation, and process the expected timing data to determine refactored timing data modifying the timing for one or more the members for a remainder of the virtual meeting environment overall.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 7:
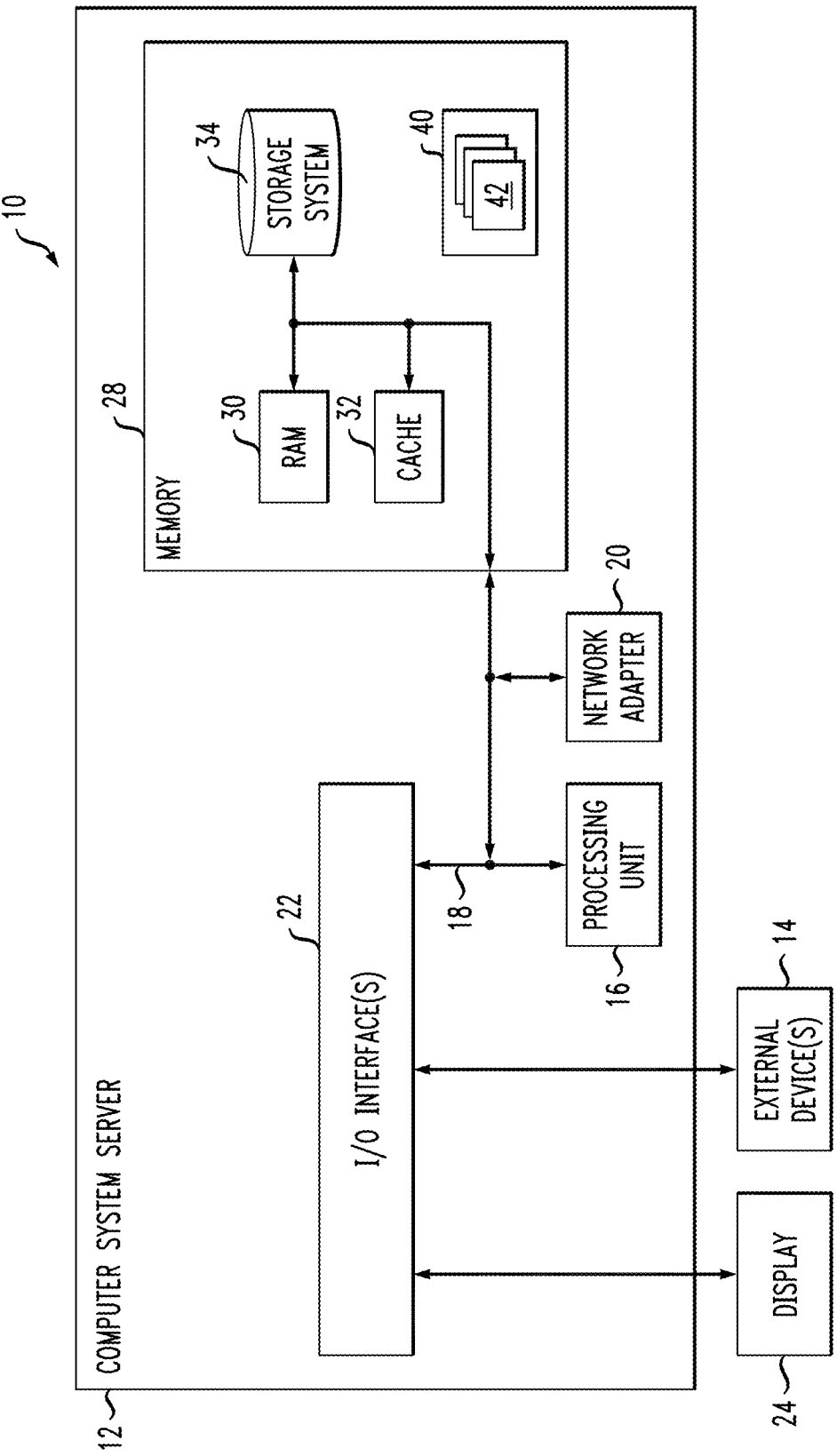

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a virtual meeting environment established between a plurality of computing devices, the method comprises:
    initializing the virtual meeting environment;
    receiving an opt in from each of a plurality of member devices of the plurality of computing devices, the plurality of member devices corresponding to respective members;
    receiving expected timing data for the virtual meeting environment, individual ones of the members, and for a plurality of tiers of the members;
    monitoring a time of speech for each of the members within the virtual meeting environment and a total time of the speech of the members within the virtual meeting environment overall;
    determining a deviation from the expected timing data;
    communicating a first control signal to one or more of the member devices, the first control signal causing the one or more of the member devices to output a notification of the deviation; and
    processing, using time refactoring rules defining actions based on the time of speech for each of the members and the total time of the speech of the members, the expected timing data to determine refactored timing data modifying the expected timing data for one or more the members, contingent on the plurality of tiers of the members, for a remainder of the virtual meeting environment overall,
    wherein the time refactoring rules define a first action of the actions that prohibits a reduction of the expected timing data for a higher tier member due to the deviation from the expected timing data for a lower tier member, and the expected timing data for another lower tier member is reduced due to the deviation from the expected timing data for the lower tier member, wherein the plurality of tiers are disposed in a hierarchy.

2. The method of claim 1, wherein the monitoring, determining the deviation, communicating the first control signal, and processing the expected timing data is performed by a server-side computing device of the plurality of computer devices, wherein the server-side computing device is executing a host application.

3. The method of claim 1, wherein the monitoring, determining the deviation, communicating the first control signal, and processing the expected timing data is performed by the computing devices locally and synchronized by a server-side computer device executing a host application.

4. The method of claim 1, further comprising displaying the refactored timing data by each of the computing devices.

5. The method of claim 1, further comprising displaying the refactored timing data on less than all of the computing devices based on the plurality of tiers of the members.

6. The method of claim 1, wherein modifying the timing for one or more the members comprises communicating second control signals causing the one or more of the member devices to update a displayed indication of the refactored timing data.

7. The method of claim 1, further comprising maintaining, by a server-side computing device, a table comprising the expected timing data for the virtual meeting environment and the members, and the time of speech for each of the members, and maintaining the refactored timing data for each of the members upon determining the deviation from the expected timing data.

8. A computer readable storage medium comprising computer executable instructions which when executed by a computer cause the computer to perform a method for managing a virtual meeting environment established between a plurality of computing devices, the method comprising:
    initializing the virtual meeting environment;
    receiving an opt in from each of a plurality of member devices of the plurality of computing devices, the plurality of member devices corresponding to respective members;
    receiving expected timing data for the virtual meeting environment, individual ones of the members, and for a plurality of tiers of the members;
    monitoring a time of speech for each of the members within the virtual meeting environment and a total time of the speech of the members within the virtual meeting environment overall;
    determining a deviation from the expected timing data;
    communicating a first control signal to one or more of the member devices, the first control signal causing the one or more of the member devices to output a notification of the deviation; and
    processing, using time refactoring rules defining actions based on the time of speech for each of the members and the total time of the speech of the members, the expected timing data to determine refactored timing data modifying the expected timing data for one or more the members, contingent on the plurality of tiers of the members, for a remainder of the virtual meeting environment overall,
    wherein the time refactoring rules define a first action of the actions that prohibits a reduction of the expected timing data for a higher tier member due to the deviation from the expected timing data for a lower tier member, and the expected timing data for another lower tier member is reduced due to the deviation from the expected timing data for the lower tier member, wherein the plurality of tiers are disposed in a hierarchy.

9. The computer readable storage medium of claim 8, wherein the monitoring, determining the deviation, communicating the first control signal, and processing the expected timing data is performed by a server-side computing device of the plurality of computer devices.

10. The computer readable storage medium of claim 8, wherein the monitoring, determining the deviation, communicating the first control signal, and processing the expected timing data is performed by the computing devices locally and synchronized by a server-side computer device.

11. The computer readable storage medium of claim 8, wherein the method further comprises displaying the refactored timing data by each of the computing devices.

12. The computer readable storage medium of claim 8, wherein the method further comprises displaying the refactored timing data on less than all of the computing devices based on the plurality of tiers of the members.

13. The computer readable storage medium of claim 8, wherein modifying the timing for one or more the members comprises communicating second control signals causing the one or more of the member devices to update a displayed indication of the refactored timing data.

14. The computer readable storage medium of claim 8, wherein a server-side computing device maintains a table comprising the expected timing data for the virtual meeting environment and the members, and the time of speech for each of the members, and the refactored timing data for each of the members upon determining the deviation from the expected timing data.

15. A computer implemented system comprising:
- a learning module accessing data collected in a first instance of a meeting and determining expected timing data for a plurality of members;
- a refinement module accessing the expected time data; and
- a monitoring and reaction module tracking speech uttered by members during a second instance of the meeting, wherein the members are associated with a plurality of computing devices connected by a network and establishing a virtual meeting environment,
- wherein the monitoring and reaction module is embodied by a server-side computing device of the computing devices, the monitoring and reaction module configured to determine a deviation from the expected timing data, communicate a first control signal to one or more of the computing devices configured to cause the one or more of the member devices to output a notification of the deviation, and process, using time refactoring rules defining actions based on a time of speech for each of the members and a total time of the speech of the members, the expected timing data to determine refactored timing data modifying the expected timing data for one or more the members, contingent on a plurality of tiers of the members, for a remainder of the virtual meeting environment overall,
- wherein the time refactoring rules define a first action of the actions that prohibits a reduction of the expected timing data for a higher tier member due to the deviation from the expected timing data for a lower tier member, and the expected timing data for another lower tier member is reduced due to the deviation from the expected timing data for the lower tier member, wherein the plurality of tiers are disposed in a hierarchy.

16. The computer implemented system of claim 15, further comprising a database comprising a table listing the expected timing data for the virtual meeting environment and the members, and the refactored timing data.

17. The computer implemented system of claim 15, further comprising a display of the server-side computing device displaying indications of the refactored timing data for each of the members.

\* \* \* \* \*